(12) United States Patent
Cipriano et al.

(10) Patent No.: US 11,979,910 B2
(45) Date of Patent: May 7, 2024

(54) METHOD FOR TRANSMITTING DATA STREAM PACKETS WITHIN A WIRELESS COMMUNICATION NETWORK

(71) Applicant: THALES, Courbevoie (FR)

(72) Inventors: Antonio Cipriano, Gennevilliers (FR); David Faure, Gennevilliers (FR); Didier Pirez, Gennevilliers (FR)

(73) Assignee: THALES, Courbevoie (FR)

( * ) Notice: Subject to any disclaimer, the term of this patent is extended or adjusted under 35 U.S.C. 154(b) by 332 days.

(21) Appl. No.: 17/634,989

(22) PCT Filed: Aug. 4, 2020

(86) PCT No.: PCT/EP2020/071916
§ 371 (c)(1),
(2) Date: Feb. 13, 2022

(87) PCT Pub. No.: WO2021/028268
PCT Pub. Date: Feb. 18, 2021

(65) Prior Publication Data
US 2022/0295559 A1    Sep. 15, 2022

(30) Foreign Application Priority Data

Aug. 13, 2019   (FR) ...................................... 1909149

(51) Int. Cl.
*H04W 74/0816*   (2024.01)
*H04W 28/26*   (2009.01)
(Continued)

(52) U.S. Cl.
CPC ....... *H04W 74/0816* (2013.01); *H04W 28/26* (2013.01); *H04W 72/0446* (2013.01); *H04W 72/0453* (2013.01); *H04W 74/0866* (2013.01)

(58) Field of Classification Search
CPC ............. H04W 74/0816; H04W 28/26; H04W 72/0446; H04W 72/0453; H04W 74/0866;
(Continued)

(56) References Cited

U.S. PATENT DOCUMENTS 4,639,937 A   1/1987 McRae et al.
2019/0363843 A1*  11/2019 Gordaychik .............. H04L 1/08
(Continued)

OTHER PUBLICATIONS

Zhao, et al., "Practical relay networks: A generalization of hybrid-arq", IEEE Journal on Selected Areas in Communications (Special Issue on Wireless Ad Hoc Networks), vol. 23, No. 1, pp. 7-18, Jan. 2005.

(Continued)

*Primary Examiner* — Dady Chery
(74) *Attorney, Agent, or Firm* — BakerHostetler

(57) ABSTRACT

A method for transmitting data stream packets within a wireless communication network, includes the following steps: at at least one node: computing, from the signatures Si of the streams Fi to which the node has subscribed and for each of these streams Fi, reserved resources RBres wherein there is no collision, and resources RBcomp potentially in competition, wherein collisions are possible, checking whether the current resource RB is reserved or whether it is in competition, if the current resource RBres is reserved if the node is the packet transmission source or if the node has already correctly decoded the packet, transmitting the packet of the stream associated with the resource, if not, attempting to decode the packet of the stream and, if the decoding is correct, storing the decoded packet in memory, if the current resource RBcomp is in competition, applying a method for managing stream collisions on the resources where n>1.

19 Claims, 4 Drawing Sheets

(51) Int. Cl.
*H04W 72/0446* (2023.01)
*H04W 72/0453* (2023.01)
*H04W 74/08* (2009.01)

(58) Field of Classification Search
CPC ... H04W 74/04; H04W 84/18; H04W 28/021; H04W 74/08; H04W 28/0268; H04L 47/15

See application file for complete search history.

(56) References Cited

U.S. PATENT DOCUMENTS

| | | | |
|---|---|---|---|
| 2020/0274656 A1* | 8/2020 | Gordaychik | H04L 67/125 |
| 2022/0109546 A1* | 4/2022 | Panteleev | H04L 1/1887 |

OTHER PUBLICATIONS

Zhao, et al., "Position-based relaying with hybrid-ARQ for efficient ad hoc networking," EURASIP Journal on Wireless Communications and Networking, pp. 610-624, 2005.

Sirkeci-Mergen, et al., "Coverage analysis of cooperative broadcast in wireless networks", Proc. IEEE Workshop on Signal Processing and Advances in Wireless Communication, Jul. 2004.

Sirkeci-Mergen, et al., "Asymptotic analysis of multistage cooperative broadcast in wireless networks", IEEE Transactions on Information Theory, vol. 52, No. 6, Jun. 2006.

Sirkeci-Mergen, et al., "On the broadcast capacity of wireless networks with cooperative relays", IEEE Transactions on Information Theory, vol. 56, No. 8, pp. 3847-3861, Aug. 2010.

Boyd, et al., "Combinatorial code designs for ultra-reliable IoT Random access", in IEEE International Symposium on Personal, Indoor, and Mobile Radio Communications workshops (PIMRC 2017), Oct. 2017.

Boyd, et al., "Interference Cancelling Codes for Ultra-Reliable Random Access", International Journal of Wireless Information Networks, vol. 25, No. 4, Dec. 2018.

Fragouli, et al., "Network Coding Fundamentals", NOW editor, Foundations and Trends in Networking, pp. 1-133, vol. 2, No. 1, (2007).

Srinivas, et al., "Finding Minimum Energy Disjoint Paths in Wireless Ad-Hoc Networks", Wireless Networks 11, pp. 401-417, 2005.

Sirkeci-Mergen, et al., "On the broadcast capacity of wireless networks", Proc. of Information Theory and Applications Workshop, 2007.

"On sidelink resource allocation mechanism", Mediatek Inc., 3GPP TSG RAN WG1 Ad-Hoc Meeting 1901, R1-1900199, Jan. 2019.

"Discussion on Uu-Based NR sidelink resource allocation", Fujitsu, 3GPP TSG RAN WG1 Ad-Hoc Meeting #94bis, R1-1810594, Oct. 2018.

* cited by examiner

METHOD FOR TRANSMITTING DATA STREAM PACKETS WITHIN A WIRELESS COMMUNICATION NETWORK

CROSS-REFERENCE TO RELATED APPLICATIONS

This application is a National Stage of International patent application PCT/EP2020/071916, filed on Aug. 4, 2020, which claims priority to foreign French patent application No. FR 1909149, filed on Aug. 13, 2019, the disclosures of which are incorporated by reference in their entirety.

FIELD OF THE INVENTION

The invention relates to a method for transmitting data stream packets within a wireless communication network. It applies to point-to-multipoint transmission, generally denoted here using the term "multicast", one node of the network wishing to transmit its message to multiple other nodes of the network. It is also applicable in a communication network operating in unicast mode and in broadcast mode.

In the field of transmissions, a set of resources is made available in order to propagate a packet in the network. For example, in a time division multiple access or TDMA network, the resources may be time slots. In a frequency division multiple access or FDMA network, the resources are frequencies; in the code division multiple access or CDMA technique, the resources are spreading codes; in multiple input multiple output or MIMO systems, the resources are spatial beams and any possible combination depending on the physical layer PHY and the network access layer or MAC that is used.

BACKGROUND

Multiplexing multiple multicast streams in a mobile ad-hoc wireless network (MANET) constitutes a technical problem as soon as resources are not abundant, this being the case in current MANET networks. For this type of network, generally speaking, there is an increase in requirements in terms of data rate, number of services supported, number of nodes simultaneously served in the network, decrease in latency, etc.

To compensate for the lack of resources, current MANET networks use multiple logic channels in parallel (on orthogonal resources, which take different forms depending on the PHY layer and the MAC layer that are used) and dynamic resource allocation in order to be able to best exploit the resources according to instantaneous traffic requirements.

However, some services with strict latency constraints require appropriate radio resource management in order to reduce resource allocation times, since the resource allocation delay weighs directly on the end-to-end latency experienced by end users in terms of service. The problem of the allocation delay (or time) is very significant in MANET networks, since, in this type of network, the nodes may be located multiple hops from one another (that is to say the nodes are connected to one another by other nodes in the network, which relay the messages), thereby making the allocation problem more difficult and the allocation delay longer than in networks in which all of the nodes are connected directly to a central node, as in the cells of a cellular system. In general, the resource allocation time increases with the number of nodes in a network, and it is therefore difficult to control this time in a MANET network.

This control may be achieved for example by pre-reserving resources, or by pre-empting resources directly available for the time-constrained service, or by adopting very responsive and fast resource allocation mechanisms (for example by having very short time slots and short allocation cycles, as in civilian 5G). Moreover, it is important, in point-to-multipoint communications within a MANET network characterized by a highly dynamic topology due to the mobility of its nodes, to have a multi-hop broadcast protocol that is fast and robust to topological changes. The cooperative broadcast technique is a prior-art method that has these features. Finally, another problem with MANET networks concerns the management of multiple streams to be broadcast to all or multiple parts of the network. When it is desired to provide the MANET network with an additional logic channel (for signaling or data transmission) or to expand the capacity of existing channels, the conventional approach consists in adding a new frequency/code/spatial layer. However, since the number of frequency resources/code resources/spatial layers is limited, it is not always easy to add new streams to the network. This may pose a problem when it is desired for example to increase the number of nodes of the network (scaling up the network). Moreover, if some of the resources are pre-reserved for latency-constrained services, the addition of new logic channels may be more complex.

U.S. Pat. No. 4,639,937 discloses the avalanche relaying technique, which uses the principle of cooperative broadcast relaying. The idea of this patent is as follows: a source transmits a message (one or more times) through a signal that may possibly be repeated. All of the nodes of the network that correctly receive the message together retransmit the same signal on the same pre-established resources (that is to say slots having the same frequency in a TDMA system). The relay nodes may establish that the message is correct using methods known from the prior art, such as adding a cyclic redundancy check or CRC code to the transmission, which is used at reception to detect errors, or else using criteria linked to the quality of the signal, or to other metrics (such as accumulated mutual information) used or computed during the message decoding process. Patent U.S. Pat. No. 4,639,937 emphasizes that it is necessary to have a shared network time (network synchronization), and the nodes should be able to manage the reception of multiple copies of the signal, since the technique generates an artificial multipath channel at a given receiver. This patent, written in the context of HF transmissions, generalizes the idea of single-frequency transmission, used in radio broadcasting, to the multi-hop case. This technique therefore has the advantage of efficiently exploiting the available resources to flood the network, since it needs a number of resources equal to the number of hops, and not to the number of nodes of the network. It also benefits from a power gain (multiple transmitters transmit the same signal), and from a spatial diversity gain (the various links between the transmitters and a given receiver), which is transformed into path diversity.

The publication by B. Zhao and M. C. Valenti, "Practical relay networks: A generalization of hybrid-arq," IEEE Journal on Selected Areas in Communications (Special Issue on Wireless Ad Hoc Networks), vol. 23, no. 1, pp 7-18, January 2005, and the publication by B. Zhao and M. C. Valenti, "Position-based relaying with hybrid-ARQ for efficient ad hoc networking," EURASIP Journal on Wireless Communications and Networking, 2005 describe a cooperative broadcast technique coupled with incremental redundancy. In Zhao, the resources are divided into time slots. Based on the message, the source uses a channel coding technique to generate a codeword containing redundant information characterized by a coding rate between 1 and M. The codeword representing the message from the source is then divided into M parts, and each is sent in a different slot. The receiving nodes (which are potential relays) listen during the slots allocated to the transmission and implement a technique known as "code combining", that is to say the nodes accumulate the information received in all of the previous slots until managing to decode the message correctly. From a practical point of view, information may be accumulated in this way for example by accumulating log likelihood ratios (LLR) of the coded bits of the message before decoding the error correction code. For a given slot, all of the nodes that were able to decode the message correctly recode it and participate in the transmission in the next slot. In addition to the simple relaying strategy (any node that correctly decoded relays), the publication also proposes intelligent activation of relays depending on their position with respect to the destination.

The publications by B. Sirkeci-Mergen and A. Scaglione, "Coverage analysis of cooperative broadcast in wireless networks", in Proc. IEEE Workshop on Signal Processing and Advances in Wireless Communication, Lisbon, Portugal, July 2004, pp. 16-20 and by Sirkeci-Mergen, A. Scaglione, and G. Mergen, "Asymptotic analysis of multistage cooperative broadcast in wireless networks", IEEE Transactions on Information Theory, vol. 52, no. 6, pp. 2531-2550, June 2006 also explicitly reveal the operation of cooperative broadcasting, in which all nodes participate in the simultaneous retransmission of the received packet, as soon as the packet is received correctly (in accordance with a given metric, for example the level of the Signal to Noise Ratio (SNR)). These publications also analyze the performance of relaying in cooperative broadcasting mode based on the transmission power and the decoding threshold.

The document by B. Sirkeci-Mergen and M. C. Gastpar, "On the broadcast capacity of wireless networks with cooperative relays", IEEE Transactions on Information Theory, vol. 56, no. 8, pp. 3847-3861, August 2010 evaluates the ability to broadcast multicast messages through cooperative broadcast relaying.

In a context that is constrained in terms of resources, either due to limited availability at the system level (for example, a limited number of frequencies available for the MANET), or because the resources are allocated statically or quasi-statically, for example because of latency constraints on the services, when the number of streams increases. One way of organizing their access to the resources is to introduce competitive random access. Competitive access is a well-known method that allows multiple communications on the same resources and that is of interest in the context of fourth generation (4G) communications (for example for autonomous communications between mobile equipment, "device-to-device, D2D"), and more particularly fifth generation (5G) communications, notably for transmissions by objects ("machine type communications, MTC" and "Internet of Things, IoT"), in the context of cellular communications. In this context, it is sometimes preferable not to use an orthogonal resource allocation method because the resources are limited and the number of communications is greater (or far greater) than what orthogonal resources could support. The basis is then the activity rate (which is generally low) of the objects and non-orthogonal resource allocation patterns (signatures), which may be random, deterministic or a mixture of the two. The two publications by C. Boyd, R. Vehkalahti and O. Tirkkonen, "Combinatorial code designs for ultra-reliable IoT Random access", in IEEE International Symposium on Personal, Indoor, and Mobile Radio Communications workshops (PIMRC 2017), Montreal, QC, Canada, 8-13 Oct. 2017 and "Interference Cancelling Codes for Ultra-Reliable Random Access", International Journal of Wireless Information Networks, Vol. 25, no. 4, pp. 422-433, December 2018, present, in the context mentioned briefly above, deterministic "codes", that is to say sets of such signatures.

Another technique used in network coding consists in transmitting combinations of network packets, as described in the document by Christina Fragouli and Emina Soljanin, "Network Coding Fundamentals", NOW editor, Foundations and Trends in Networking, pages 1-133, Vol. 2, No. 1 (2007).

The technical teaching in the document by Fujitsu entitled "Discussion on Uu-based NR sidelink resource allocation", XP051518000, 28 Sep. 2018, discloses a resource allocation method, notably for the semi-static allocation of resources, and implements resources that are configured for preemption or resources based on a sharing mechanism.

The technical teaching of Mediatek Inc, entitled "On sidelink resource allocation mechanism", 20 Jan. 2019, XP05159312, describes a resource allocation method.

Despite the performance of the transmission methods known from the prior art, there are still some problems. Traditionally, time-frequency resources for the transmission of a packet of a data stream are reserved exclusively (also called "orthogonal" allocation) in order to avoid interfering with other streams and receiving or generating interference. The resources may possibly be spatially reused in another area of the network where the interference produced by the first transmission (and respectively the interference produced in the new area) is negligible in the second area (and respectively in the first area).

However, when the transmission takes place over several hops and using multiple concurrent transmitters, as in the case of cooperative broadcast relaying within a MANET, the interference area is larger than in point-to-point transmissions, and this may impede the reception of another stream (on the same resources) by nodes in this interference area. Spatial reuse becomes far more constrained, and may become impossible for networks that are not very wide.

In addition, in the prior art, resources are reserved in advance in order to reduce end-to-end latency. This constitutes a drawback when there are no packets to send for a certain stream, because the resources are unused, and the use of the resources is therefore not efficient.

SUMMARY OF THE INVENTION

One of the aims of the method according to the invention is to propose a method and a system for processing multiple multicast streams in a MANET network with cooperative relaying, in particular when the data streams to be transmitted have similar, equal priorities.

In the remainder of the description, the expression "stream" or "multicast stream" is synonymous with "multicast group". Users subscribe to streams (or multicast groups) and use the corresponding resources. The following assumption is made: a user listens only to the resources allocated, that is to say with pre-reservation, to the multicast streams/groups to which he has subscribed.

Similarly, an allocation resource unit is referred to as a "Resource Block" or RB. For example, a resource block may be a time slot in a TDMA (Time Division Multiple Access) system, a code in a CDMA (Code Division Multiple Access) or derivative system, a frequency in an FDMA (Frequency Division Multiple Access) system, a block of sub-carriers in an OFDMA (Orthogonal Frequency Division Multiple Access) system, a spatial layer in a system with multiple antennas, or possible combinations of these various RB.

The solution proposed in the method according to the invention is based notably on multiplexing multiple streams in the same resources of the network by using competitive access with allocation signatures for the streams. By controlling resource allocation signatures, collisions are able to be controlled or even avoided and interference eliminated in order to reduce the impact of collisions. This allows better robustness in cooperative transmissions used to propagate the streams. A gain in total data rate (and/or latency and/or number of streams in parallel and therefore network capacity) is thus achieved.

The invention relates to a method for transmitting data stream packets within a wireless communication network, said wireless communication network comprising multiple nodes subscribed to one or more streams Fi and sharing one or more resources RBi for transmitting these streams with possibilities of a collision, one or more nodes performing the role of a source transmitting packets of one or more different streams, each stream Fi having a resource allocation signature Si drawn from a set G(Si) of available signatures Si, each resource Ri having an occupancy rate n corresponding to a number of allocated streams, characterized in that it comprises at least the following steps:

At at least one node:
  computing, from the signatures Si of the streams Fi to which the node has subscribed and for each of these streams Fi, reserved resources RBres in which there is no collision, and resources RBcomp potentially in competition, in which collisions are possible,
  checking whether the current resource RB is reserved or whether it is in competition,
  if the current resource RBres is reserved,
  if the node is the packet transmission source or if the node has already correctly decoded the packet, transmitting the packet of the stream associated with the resource,
  if not, attempting to decode the packet of the stream and, if the decoding is correct, storing the decoded packet in memory,
  if the current resource RBcomp is in competition, applying a method for managing stream collisions on the resources where n>1.

The wireless communication network is for example a multi-hop ad-hoc network that uses a cooperative relaying or cooperative broadcasting technique.

Time division multiple access time slots on one or more frequency channels may be used as resources RBi.

It is possible to use time division multiple access time slots on one or more frequency sub-bands, such as OFDMA systems or precoded OFDMA systems, as resources.

Time division multiple access time slots on one or more codes, and/or on one or more layers and/or spatial beams, may be used as resources RBi.

The set of available signatures may be preconfigured in all of the nodes or be determined dynamically by the nodes, or even evolve over time or in terms of frequency in accordance with a pseudo-random sequence known to all of the nodes.

The assignment of a signature to a stream may be predetermined using a pseudo-random sequence computed from common parameters.

The collision management method is a collision avoidance method comprising at least the following steps:
  checking, in the memory of a node, the packets of streams in competition that have already been decoded correctly, the combinations of packets of the streams in competition that have already been decoded correctly by the node,
  attempting to form the combination of packets that corresponds to the streams in competition on the current resource RBcomp from packets or combinations of packets present in memory and decoded correctly by the node,
  if the combination is formed, transmitting the combination of packets that corresponds to the streams in competition on the current resource RBcomp,
  if not, listening in order to decode a combination of packets that corresponds to the streams in competition on the current resource RBcomp, the combination possibly being transmitted by other nodes of the network and, if the decoding is correct, storing this combination of decoded packets in memory.

The packets of the streams may be combined by applying exclusive or "XOR", bit-by-bit, to the packets decoded by the node.

The packets of the streams are for example combined by applying a network coding technique in the physical layer, which combines the baseband signals corresponding to the packets in question.

The collision management method that is used may be an interference suppression method comprising at least the following steps
  checking, in the memory of a node, which packets of the streams in competition have already been decoded correctly,
  applying a decision function between listening or transmitting streams based on the number of packets of the streams in competition that have already been decoded and are present in memory and on the transmission policy,
  when the node is listening, storing the packets sent on the resource in competition RBcomp by the other nodes and decoded by the node, and applying an interference cancelation-based multi-user reception technique in the physical layer,
  when the node is transmitting, transmitting the stored stream packet depending on the transmission policy of the stream.

The choice, at a node, between listening and transmitting is made for example based on at least one of the following items of information:
  the priority of the data streams,
  the energy consumption of the node,
  the battery level of the node,
  a transmission probability applied in order to reduce the probability of a collision,
  the nature and the function of the node.

The choice of the stream to be transmitted for a node may be made based on quality of service information associated with the stream, its activity rate coupled with neighborhood/density information.

The transmitted packet may result from a combination of the decoded packets present in memory.

Each transmitter node transmits for example with a transmission, power control and transmitted signal feature adaptation policy that is chosen based on the time/frequency synchronization quality, the type of node and its battery level.

The invention also relates to a system for transmitting packets in a wireless communication network, said communication network comprising multiple nodes subscribed to one or more streams Fi and sharing one or more resources RBi for transmitting these streams with possibilities of a collision, one or more nodes performing the role of a source transmitting packets of one or more different streams, each stream Fi having a resource allocation signature Si drawn from a set G(Si) of available signatures Si, each resource Ri having an occupancy rate n corresponding to a number of allocated streams, characterized in that each of the nodes $N_1, \ldots N_6$ comprises a transceiver, in conjunction with a processor configured so as to execute the steps of the method according to the invention, a database for storing the signatures.

BRIEF DESCRIPTION OF THE DRAWINGS

Other features and advantages of the present invention will become more clearly apparent from reading the description of exemplary embodiments provided by way of completely non-limiting illustration alongside the appended figures, in which.

DETAILED DESCRIPTION

In the prior art, it is known to associate orthogonal resources with each multicast stream. The allocation signature of a stream is the vector that indicates the resources allocated to the streams from among those available in the system. This vector may take the form of a bitmap on a sequence of length equal to the number of available RB (0=RB not allocated, >0=RB allocated), or a vector of variable size that contains the indices of the units of allocated allocation resources RB, or any other form of encoding this information.

Figure 1:
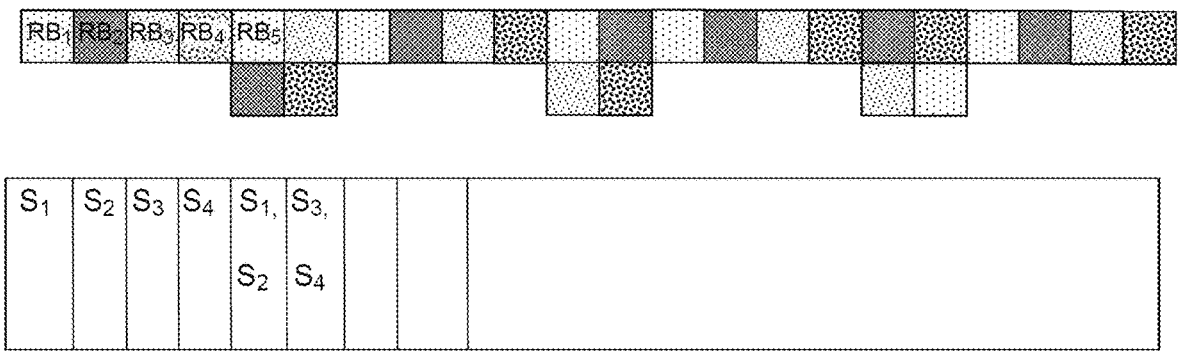
FIG. 1 illustrates the allocation of signatures in a resource block.

With well-constructed families of allocation signatures, it is possible to control collisions and to set various performance levels. FIG. 1, which indicates, in correspondence with a resource block RBi, the identifier of the signatures Si to which the RBi is allocated, illustrates one example in which each allocation signature has one and only one collision with any other signature, the signature $S_1$ collides with signature $S_2$ on the resource block RBs. This makes it possible to reduce the number of RBs required to transmit data streams or packets compared to the case of orthogonal allocation, that is to say signatures that have no resource block RB in common, while at the same time limiting the induced degradation of the quality of service.

In the method according to the invention, it is assumed that the nodes of the network use a relaying technique based on cooperative broadcasting known from the prior art cited above. It is possible to define a transmission policy that is applied to the cooperative relaying adopted by the nodes. The policy is set in the group of subscribers to a stream, or even the node, based on one or more of the following metrics or parameters: the network and/or group and/or node configuration parameters, measurements of interference/topology/activity rate in the nodes and/or in the groups and/or in the streams, measurements of parameters of the node (for example energy consumption), roles that the nodes may have in a network (gateway, cluster leader) or in an operational structure (group leader, hub, etc.), the type of equipment (vehicular, portable, fixed station, etc.). The multicast streams have associated quality of service descriptors that define the distribution constraints and the targeted performance of the streams. It is assumed that the streams have strict latency constraints and the system should implement appropriate resource management. The resources for broadcasting each message of a stream are for example pre-reserved, or they may be determined using a mechanism known from the prior art.

The method according to the invention allocates various resource allocation patterns or signatures to the streams. The signatures may be assigned to the streams dynamically in a distributed and autonomous manner, or in a distributed way with consultation between the various entities of the network. It may be performed by a centralized allocator or else statically, predetermined for the configuration by a resource scheduler. Each mode has its advantages in terms of responsiveness, resource and energy consumption for signaling and for finding the signature. For example, the signatures may be assigned in this way by defining the resource occupancy rate (defined on each RB as the number of streams that are potentially in collision, which is equal to the number of different signatures to which the RB in question is allocated). For each of the resource blocks RBi, by superimposing the allocation signatures of all of the streams, it is possible to define an occupancy rate n corresponding to the number of different streams that are allocated.

The assignment of the signatures to the streams may also take into account assumptions on traffic, load, total number of resources available, priority between streams, assumptions on spatial distribution of the nodes during the lifetime of the streams, etc.

If one and the same RB is allocated to multiple streams (signatures), that is to say the occupancy rate n is greater than one, thus having a risk of collisions. The method will decide either to handle the collisions (behave as if they did not exist), or to implement a collision avoidance procedure described below or else to implement an interference suppression procedure described below. The choice may be made per stream or be common to multiple streams. The choice to handle collisions may be static and made at the time of configuration, or may change dynamically during communications. In the latter case, the decision on the type of interference handling is made either centrally in one entity of the network and broadcast to the others, or negotiated dynamically between the nodes or groups of nodes subscribed to a stream. The choice of the type of collision handling may depend on the processing capabilities of the nodes. A policy of combining the streams on the resources where n is greater than one may depend on the density of the network, the priority of the streams in competition, etc.

Figure 2:
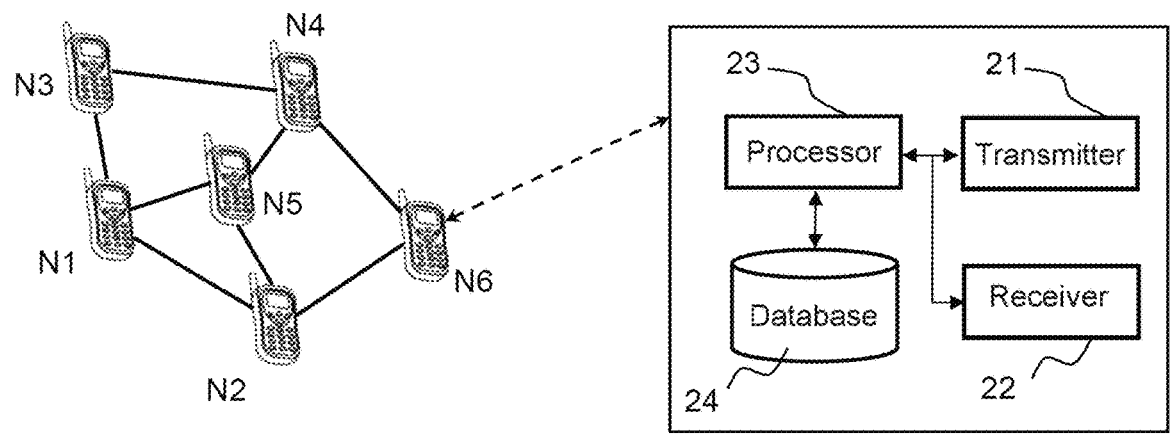
FIG. 2 illustrates one example of a network model.

FIG. 2 illustrates one example of a communication network comprising multiple nodes using, between one another, a communication protocol known to those skilled in the art. The communication protocol is based on cooperative broadcasting. A node participating in the communication has the modules and the elements required for it to be autonomous. A node $N_1, \ldots N_6$ thus comprises a transceiver, 21, 22, linked to a processor 23 configured so as to execute the steps of the transmission method according to the invention, a database or a memory space 24 for storing for example signatures dedicated to each of the nodes of the network or any other way of storing the signatures (for example, it is possible to indicate the identifiers of the signatures that are generated when necessary).

Figure 3:
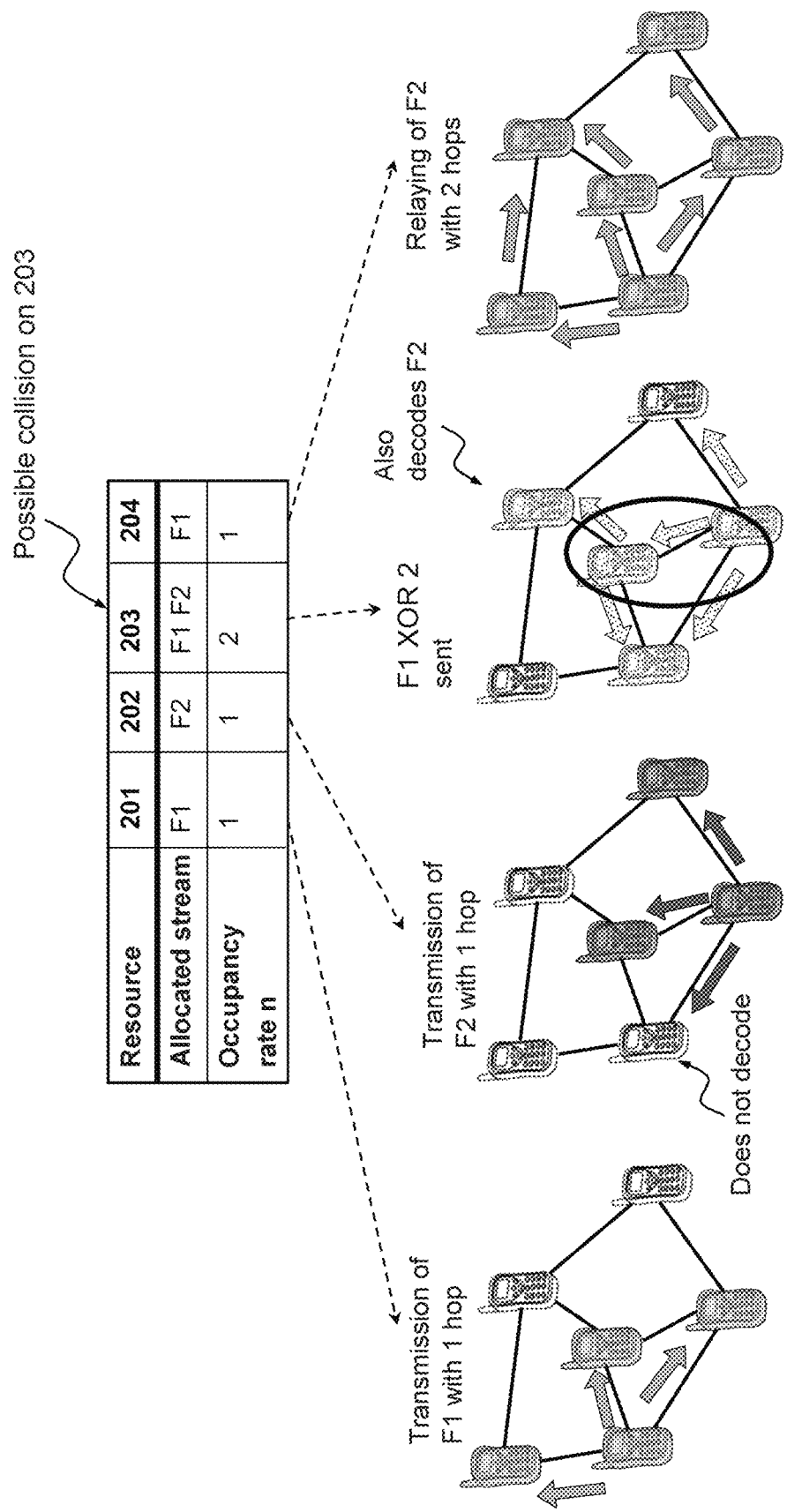
FIG. 3 shows one example of collision management in a communication network comprising multiple nodes communicating in broadcast mode.

A description is given here of one way to avoid collisions, which consists in managing the streams in a particular way. In the example of FIG. 3, the stream $F_1$ and the stream $F_2$ should be distributed to all of the nodes of the network. These are aware of the signature assigned to each of the streams. In the example, but without being limiting, the signatures have a length of 3 and collide on a resource. The source of the stream $F_1$ is the node $N_1$. The source of the stream $F_2$ is the node $N_2$. The stream $F_1$ and the stream $F_2$ are initially transmitted without a collision, each on a separate time slot, 201, 202. It will be assumed that, on the RB 201, the nodes $N_2$, $N_3$ and $N_5$ correctly decode the packet of the stream $F_1$ whose bits are $\alpha_1$, $\alpha_2$, ..., $\alpha_K$. It will be assumed that, on the RB 202, the nodes $N_5$ and $N_6$ correctly decode the packet of the stream $F_2$ whose bits are $b_1$, $b_2$, ..., $b_K$. The node $N_1$ does not manage to decode the packet of the stream $F_2$, even though it is within range, because for example the signal has faded strongly. There is a possible collision on the RB 203. This is identified by all of the nodes of the network, which know the signatures of the stream $F_1$ and of the stream $F_2$. In order to avoid the collision, on the resource block RB 203, each of the nodes applies the following procedure. Each node checks whether it has received and correctly decoded the packets $P_1$ and $P_2$ of the two streams $F_1$ and $F_2$ sent in current relay sessions. If so, the node forms a third packet $P_3$ by performing for example an XOR operation on the bits of the decoded information packets, $c_k=\alpha_k \oplus b_k$, k=1, ..., K. This new packet, associated with a stream $F_3$ whose bits are $c_1$, $c_2$, ..., $c_K$, is sent on the resource block RB 203. Only the nodes $N_2$ and $N_5$ are able to send the packet of the stream $F_3$ in the RB 203. It will be assumed that the nodes $N_1$ and $N_4$ correctly decode the packet of the stream $F_3$. Immediately, the nodes seek to combine the packet that they have just decoded with the packets of the other streams that are in their memory, if they have not already decoded the packets of the two streams. In particular, the node $N_1$ already has the packet of the stream $F_1$ in its memory. It is therefore able to derive the packet of the stream $F_2$ by using an XOR to combine the bits of the packets of the streams Fi and $F_3$: $b_k=\alpha_k \oplus c_k$, k=1, ..., K, it thus retrieves the packets from the two streams of interest. The memory of the node Na, on the other hand, does not contain either the packet of the stream $F_1$ or that of the stream $F_2$. It is therefore not able, for the time being, to derive these packets, but it keeps the packet of the stream $F_3$ in memory. In the RB 204, only the nodes that have correctly decoded the packet of the stream $F_1$, that is to say the nodes $N_1$, $N_2$, $N_3$, $N_5$, are able to transmit it using the cooperative broadcast protocol. It will be assumed that the remaining nodes (Na, $N_6$) decode the packet correctly. The node Na immediately checks in its memory, and it sees that the packet of the stream $F_3$ is present there and, by combining it with that of the stream $F_1$, it is able to compute the packet of the stream $F_2$: $b_k=\alpha_k \oplus c_k$, k=1, ..., K. The node $N_6$ saves the packet of the stream $F_1$ in its memory with that of the stream $F_2$, in the event of other colliding slots. In the RB 205, only the nodes that have correctly decoded the packet of stream $F_2$, that is to say the nodes $N_1$, $N_2$, $N_4$, $N_5$, $N_6$, are able to transmit it using the cooperative broadcast protocol. The node $N_3$ will therefore also be able to decode the packet of the stream $F_2$.

In general, according to a first embodiment, in the event of collisions between transmissions of users of one and the same multicast group on pooled resources, inter-packet collisions will be avoided by performing the steps described below. It will be assumed that the size of the packets of the streams Fi transmitted by the users is the same. This is the case for example for voice broadcast services, alarms and signaling. In the colliding resource blocks, transmission is authorized only for nodes that have already correctly decoded all of the packets Pi of the streams Fi potentially colliding on the RB or the nodes that are able to form the combined packet from the packets or combinations of packets that were previously correctly decoded. The transmitted packet will be a combination of the already decoded packets, for example using the "network coding" method, in other words, a node will generate a new packet through an "exclusive or" XOR operation. To transmit on a resource RB that has an occupancy rate n, for example, the node must have correctly decoded the n streams broadcast during this relay session that are allocated to this RB. The XOR operation may be replaced by any linear or non-linear operation for combining the streams in order to generate a stream able to be transmitted on a resource block. This operation is identical in all of the nodes that are able to perform the XOR operation. By operating in this way, a single packet and a single identical transmitted signal are sent by all of the nodes on the resource in competition, and there is no longer a collision.

In another implementation, the system proceeds as above but, instead of using a "network coding" technique, it uses a technique that implements joint coding of the information of two (or more) packets, known by the name "Physical Layer Network Coding", in the PHY layer.

It is possible to add variants to this collision avoidance strategy. If the probability of collision is low, the resources dedicated to transmitting packets with XOR will not be used and will probably be wasted. This collision avoidance method should thus be used, for example, in the case of traffic and a dense topology. According to one variant embodiment, if the system dynamically becomes aware that some resources often collide, it may activate the "network coding" mode, for example when the collision rate exceeds a certain threshold Vs, only on these resources.

Figure 4:
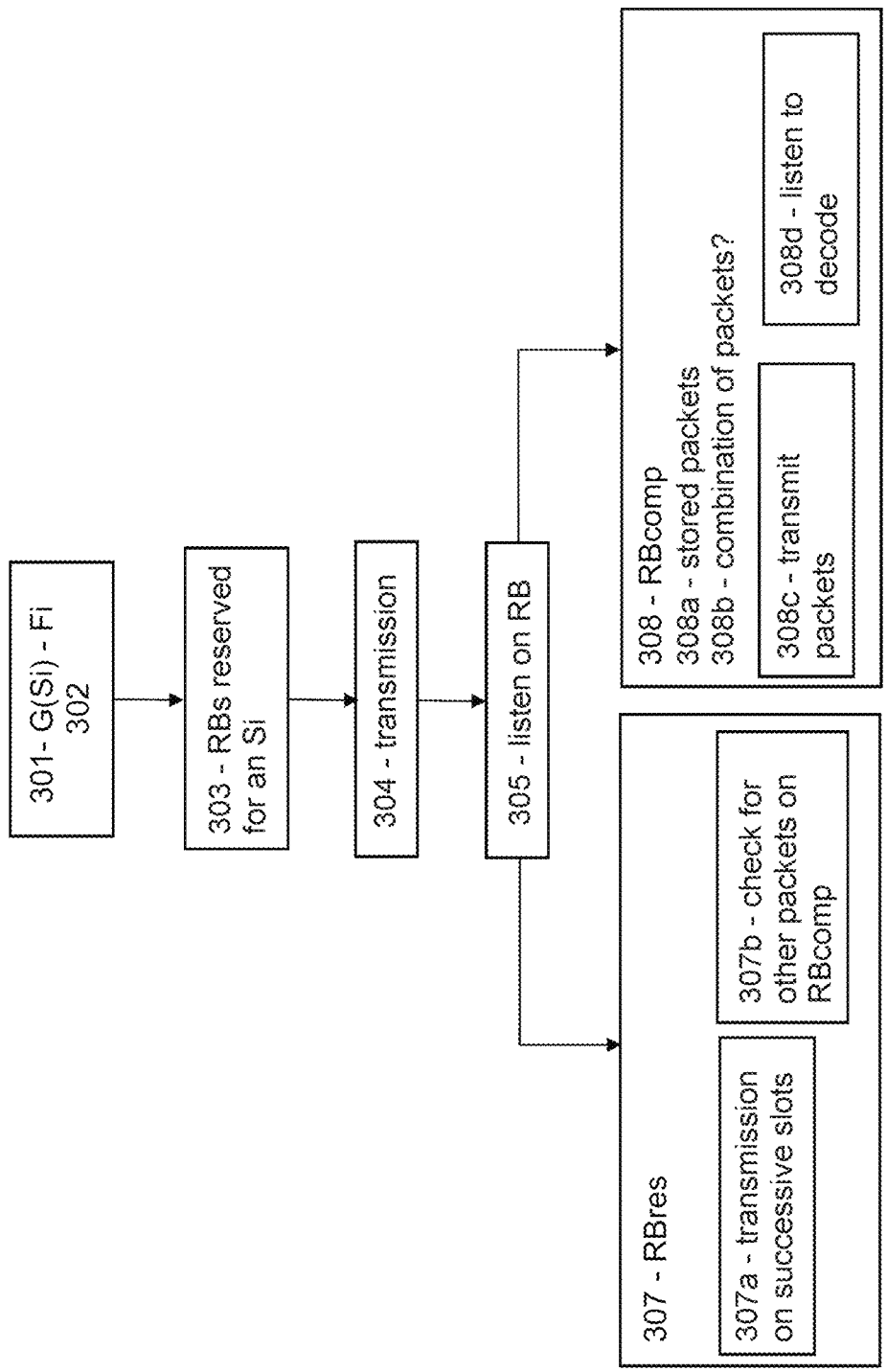
FIG. 4 shows the steps of the method according to a first variant embodiment.

FIG. 4 illustrates one example of a succession of steps according to a first variant embodiment.

In a network, a set G(Si) of signatures Si is bijectively associated with the streams to be broadcast. This set G(Si) of signatures Si is known by all of the nodes of the network and for each relay session. G(Si) may be preconfigured or evolve dynamically, for example in accordance with a pseudo-random sequence known by all of the nodes. It may also be determined dynamically by the nodes.

The method then comprises the following steps:

301—Within a set of signatures G(Si), a signature is assigned to each stream Fi. This assignment of a signature to a stream takes place either in a predetermined static way, or in accordance with a pseudo-random function, or based on common parameters, or using a centralized or distributed allocation procedure. The aim is for all users who have subscribed to this stream to ascertain the associated signature;

302—The signature Si may be dynamically changed over successive relay sessions based on a pseudo-random sequence that will be computed for example from common parameters, such as the slot number of the frame or the number of the relay session, etc. The relay sessions may be within one frame or extend over multiple frames. For example, in synchronous TDMA systems organized by frames, the system all of the nodes are able to ascertain the current frame number. This number may be used as input to choose the current signature during the relay session that begins in this frame. It is assumed that all of the nodes are able to compute the same sequence;

303—In each relay session, for the streams Fi to which the nodes have subscribed, all of the nodes compute, from the corresponding signatures Si, the reserved resource blocks RB, associated with each signature, in which there is no collision, and the RBs in competition where there is a possible collision, as well as the signatures between which there is competition;

304—Each source node transmits the packets Pi of the stream $F_1$ for which it generates information, only in the RBs reserved for its signature with a given transmission and power control policy;

305—The potential receiver/relay nodes listen to the resources RB associated with the signatures of the streams to which they have subscribed, whether or not the signatures are in competition. The source of a stream associated with a signature behaves as a receiver/relay for the other streams to which the source has subscribed, All of the nodes listening to an RB attempt to decode the received packets of streams that are potentially present, and:

307—If the nodes manage to decode the packet of a specific data stream in a reserved RB, RBres, 307a—Each node deduces the packet from the stream, saves it in memory and switches to transmission mode (source or active relay) in the successive slots reserved for the corresponding stream signature. The node transmits the corresponding message using the transmission policy in force, 307b—The node uses the decoded packet of the current stream to check whether, by combining it with the correctly decoded packets of other streams that the node possibly has in memory, it manages to deduce the packets from other streams (signatures) or other combinations. If it manages to deduce the packets from other streams, the node switches to transmitting in the RBs reserved for these streams (streams obtained by combining packets). If it manages to generate combinations of packets, it switches to transmitting in the colliding RBs whose colliding signatures represent the generated combination of packets, 308—If the nodes manage to decode a data packet on an RB in competition:

A node checks, in the memory of a node, the packets of streams in competition that have already been decoded correctly 308a, the combinations of packets of the streams in competition that have already been decoded correctly by the node, 308b—attempting to form the combination of packets that corresponds to the streams in competition on the current resource RBcomp from packets or combinations of packets present in memory and decoded correctly by the node, If the combination is formed, transmitting the combination of packets that corresponds to the streams in competition on the current resource RBcomp, 308c 308d—If not, the node listens in order to decode a combination of packets that corresponds to the streams in competition on the current resource RBcomp, the combination possibly being transmitted by other nodes of the network and, if the decoding is correct, storing this combination of decoded packets in memory.

The number of transmissions, the transmission power and in general the features of the transmitted signal (data rate, robustness, etc.) may vary according to various strategies that may be determined according to parameters (link quality, device state, time/frequency synchronization quality, node type, network or user configuration, operational/hierarchical information, priority, stream quality of service, resource or node occupancy rate, etc. parameters) that are known or estimated by the nodes or distributed by an allocator.

Figure 5:
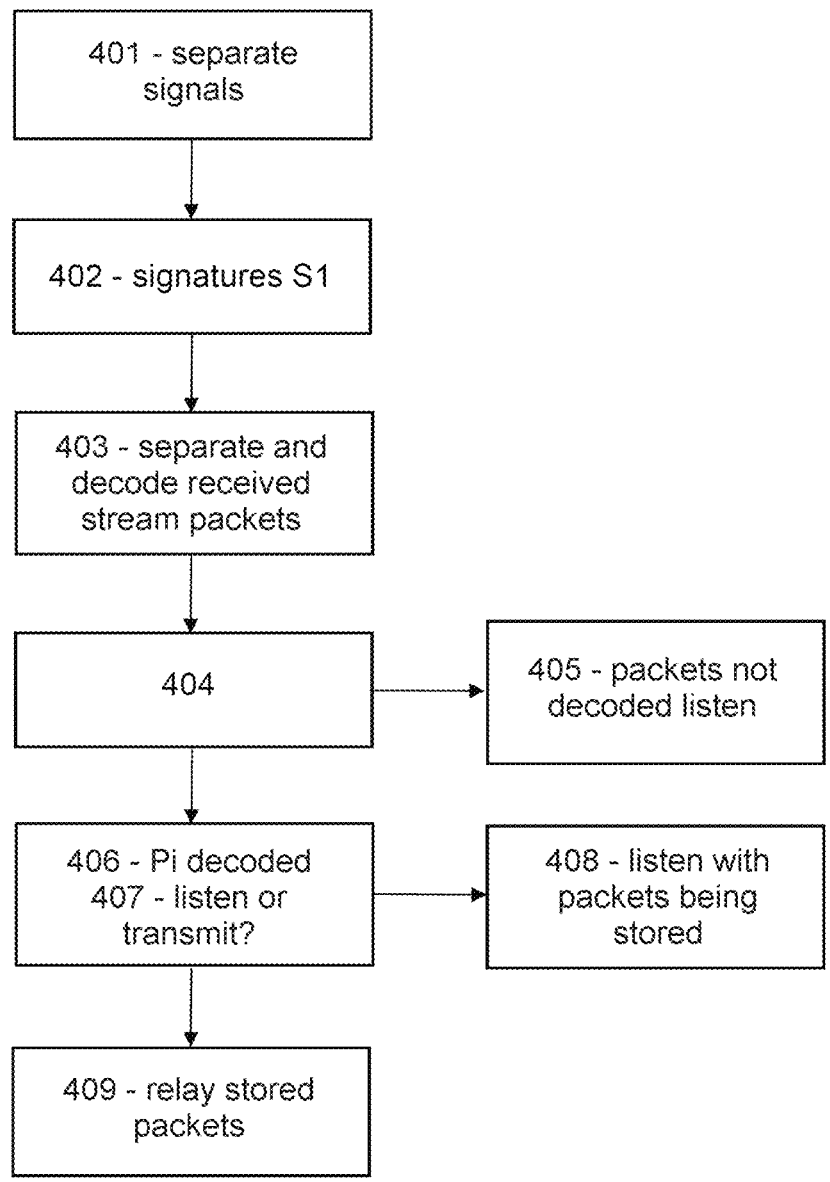
FIG. 5 shows the steps of the method according to a second variant embodiment.

FIG. 5 illustrates one example of steps implemented by another variant embodiment. When the nodes transmit different packets that collide on the same resource, the method will attempt to resolve these collisions, by handling the interference generated by the transmission of different signals (corresponding to the packets). This situation may occur either for users in one and the same group or in different groups. The frame is always the cooperative broadcast transmission.

In the presence of multiple different signals (collisions), the receiver of a node identifies the presence of one or more packets belonging to streams transmitted in cooperative broadcast mode on the resources, 401.

402, Either this information is available at the node, and so it is aware of all of the signatures used on each RB and within its reception radius, 403, Or this information is not available at all or is partially available at the node, for example because the system does not have any means to coordinate or to distribute this information perfectly between the nodes participating in the relay sessions. In this case, the node should still attempt to identify (in full or in part) how many and which streams are transmitted on the current RB in order to be able to attempt to decode them. This may be done for example by distinguishing them through pilot sequences or preambles or any other method in the physical layer, whether or not assisted by knowledge of the network configuration (neighbors, number, type and identifier of possible sequences, etc.) or by information from higher layers that helps to restrict the number of possible choices.

The receiver of the node separates and decodes (or attempts to do so) one or more packets in parallel by extracting them from the received signal. Multiple detection/decoding strategies may be adopted, either of the serial interference cancelation—SIC type or of the parallel interference cancelation—PIC type, or hybrid ones, as in "power-based NOMA", or of joint detection type (SCMA type, a "code-based NOMA" technique).

As in the embodiment with interference avoidance, when a receiving node decodes a packet, it becomes a relay for this packet on the corresponding reserved slots (RB) (associated with the corresponding signature) in accordance with the active transmission policy.

404—On an RB in competition whose occupancy rate is greater than one, the relay node computes which streams are in competition on the current RB through the knowledge that it has of the signatures to which the RB has been allocated. It will then decide whether it will listen or transmit, depending on the packets (associated with the streams in competition on the RB) that it has already successfully decoded in the current relay session:

405—If the node has not yet decoded packets corresponding to the streams in competition in the current RB of the current session, it decides to listen, 406—If the node has correctly decoded all or some of the packets of the streams in competition in the current RB of the current session, the node applies a decision function (transmit or listen), 407, which may depend on the transmission policy of the relay strategy.

If the node decides to listen, then it applies the processing operations described above, potentially by exploiting the information from the packets (streams in competition in the current RB of the relay session) that have already been decoded, and it will store the packets sent on the resource in competition by the other nodes and which it has decoded, 408, If a node decides to transmit on an RB in competition, it must choose the stream to which the packet it will send belongs, from among those it has correctly decoded, and transmit the packet based on the transmission policy of the stream, 409.

The transmission policy may take into account:

The priority of the transmissions (those that are still to be received compared to those that have already been received, for example if there is a priority alarm that has already been decoded, it is decided to transmit it or, by contrast, if the shared resource is dedicated to alarm transmission or critical signaling, it is decided to remain listening). This includes the priority attached to a service, or the priority of a group, in the case of an RB shared by different groups, A transmission probability applied in order to reduce the probability of a collision, The type and the function of the node, for example a source always transmits its packet, even on an RB in competition, or a gateway/a cluster leader will always transmit, The energy consumption of the node, its battery level.

The decision function may be pseudo-random. This may be achieved for example by randomly drawing which stream to send with a certain distribution, with the aim of guaranteeing a given quality of service level on the broadcast of the entire stream, when the broadcast of the stream is spread over multiple relay sessions. The decision function may take into account deterministic criteria, the value of parameters/configurations of the node or network, etc. The decision function of the stream (and therefore of its packet in the current relay session) to be sent uses one or more of the following items of information:

Location information: the node may decide to relay the packet of a certain stream rather than another stream based on the area of the network where it is located, to group together the transmitters of the packet in question and therefore limit the area of interference, and thereby reduce the probability of a collision.

Neighborhood/density information: in the case of multiple groups, neighborhood information coupled with group membership may help a node to decide which packet to send: for example, if the node becomes aware that the node density of a certain group is low in this area, it may decide to transmit the packet of the stream of this group as a priority in order to guarantee a better distribution rate of the packet, Priority information between the streams, The activity rate of the groups/streams/nodes: the node decides to transmit a packet of a certain stream based on a probability linked to the activity rates of the stream (number of packets run through within a certain time) or the activity rate of the groups or nodes that are interested in this stream, if available, Quality of service information associated with the streams. For example, a quality of service descriptor for a certain stream may contain robustness, number of hops to cover, etc., criteria, possibly coupled with the active transmission policies associated with each group/user.

A few numerical examples are given below to illustrate the invention.

Imagine that there is a total number of RB Ntot=24. Suppose that there are Nc=4 streams in parallel and that it is desired for each stream to use Nv=6 RBs. The conventional way is to allocate orthogonal signatures to each stream, for example the first stream will have a signature of the type (the numbers correspond to the identifier of the signature to which the RB is allocated (0 indicates that the RB is not allocated to the signature), the index of the RB is therefore the index of the digits in the sequence):

1 0 0 0 1 0 0 0 1 0 0 0 1 0 0 0 1 0 0 0 1 0 0 0

The second has a signature of the type:

0 2 0 0 0 2 0 0 0 2 0 0 0 2 0 0 0 2 0 0 0 2 0 0 and so on.

At the end, the Ntot resources will be allocated to the streams as follows:

1 2 3 4 1 2 3 4 1 2 3 4 1 2 3 4 1 2 3 4 1 2 3 4 where the number is the identifier of the stream and the vector represents the RBs of the set of resources.

In this case, there is no collision, the resources are orthogonal, the latency is the same (6 cycles of 4 resources) to run through the resources for all the streams. The robustness is the same (6 RBs per stream).

The solution consists in allowing collisions and controlling the subset of RBs on which there is a possibility of collisions by using signatures that are predefined or drawn randomly from a set of predefined signatures. As described above, there are RBs that are reserved (without collisions) for certain streams and RBs in competition between multiple streams (possible collisions).

The advantage is that the latency may be reduced, or the number of transmission occasions for a given stream may be increased, while at the same time guaranteeing a minimum performance level by virtue of the reserved RBs.

The trade-off between latency, robustness, total data rate/total spectral efficiency (and energy efficiency) is set through the choice of signatures.

In the remainder of this specific example, for simplicity, it is assumed that the nodes of the network use basic receivers and that, in the event of a collision, the packets are lost. Moreover, still for simplicity in this specific example, it is assumed that each stream is addressed to a group of separate users, and that the nodes of a group do not listen in resources that are not allocated to the signature of their stream.

Example 1

Ntot=22 RBs (decrease in resources used), Nc=4 streams, Nv=7 RBs. The signatures have partial collisions. For example, for the first stream $F_1$, it is possible to have:

1 0 0 0 1 0 1 0 0 0 1 0 1 0 0 0 0 1 1 0 0 0

For the second stream $F_2$:

0 2 0 0 2 0 0 2 00 0 2 0 2 0 0 2 0 0 2 0 0

And so on.

The final allocations will be as below (double number indicates possible collision):

| 1 | 2 | 3 | 4 | 1 | 3 | 1 | 2 | 3 | 4 | 1 | 2 | 1 | 2 | 3 | 4 | 2 | 4 | 1 | 2 | 3 | 4 |
|---|---|---|---|---|---|---|---|---|---|---|---|---|---|---|---|---|---|---|---|---|---|
|   |   |   |   | 2 | 4 |   |   |   |   | 3 | 4 |   |   |   |   | 3 | 1 |   |   |   |   |

This scheme has the following features compared to the conventional case without collisions:

One active stream: improved latency on six resources RB, or else same latency but more robustness (7 RB instead of 6)

Two active streams: since the signatures guarantee that there is only one collision between any two streams, there will be six RBs without a collision, guaranteeing the same robustness with a latency that is sometimes slightly better than that of the orthogonal system.

Three active streams: reduced robustness (5 RB/6) but even more active streams

Four active streams: further reduced robustness (4 RB/6) but even more active streams It may be clearly seen how this method makes it possible to multiplex multiple streams on fewer resources.

Example 2

Ntot=24 RBs (decrease in resources used), Nc=4 streams, Nv=8 RBs.

Other resource allocation signatures give the following distribution:

| 1 | 2 | 3 | 4 | 1 | 1 | 2 | 3 | 4 | 2 | 1 | 2 | 3 | 4 | 3 | 1 | 2 | 3 | 4 | 4 | 1 | 2 | 3 | 4 |
|---|---|---|---|---|---|---|---|---|---|---|---|---|---|---|---|---|---|---|---|---|---|---|---|
|   |   |   |   |   | 2 |   |   |   |   |   |   | 3 |   |   |   |   |   | 4 |   | 1 |   |   |   |
|   |   |   |   |   | 3 |   |   |   |   |   |   | 4 |   |   |   |   |   | 1 |   | 2 |   |   |   |

One active stream: improved latency, 16 RBs or fewer with 6 RBs or else same latency as the orthogonal case with better robustness (8 RB/6).

Two active streams: same latency and robustness (there are two possible collisions out of 8 between each pair of streams)

Three active streams: reduced robustness (5 RB/6) but better than the first example.

Four active streams: decreased robustness (5 RB/6), same robustness as the first example.

Example 3

Ntot=24 RBs (decrease in resources used), Nc=4 streams, Nv=10 RBs.

| 1 | 2 | 3 | 4 | 1 | 1 | 2 | 3 | 4 | 2 | 1 | 2 | 3 | 4 | 3 | 1 | 2 | 3 | 4 | 4 | 1 | 2 | 3 | 4 |
|---|---|---|---|---|---|---|---|---|---|---|---|---|---|---|---|---|---|---|---|---|---|---|---|
|   |   |   |   |   | 2 |   |   |   |   |   |   | 3 |   |   |   |   |   | 4 |   | 1 | 2 | 3 | 4 | 1 |
|   |   |   |   |   | 3 |   |   |   |   |   |   | 4 |   |   |   |   |   | 1 |   | 2 | 3 | 4 | 1 | 2 |

One active stream: improved latency (10 RBs) out of 6 RBs used, or else improved robustness (10 RBs/6).

Two active streams: same latency with improved robustness (7 RB/6)

Three active streams: reduced robustness (4 RB/6) as in the case of 4 streams from example 1.

Four active streams: reduced robustness (4 RB/6) as in the case of 4 streams from example 1.

Example 4

Ntot=24 RBs (decrease in resources used), Nc=4 streams, Nv=9 RBs.

| 1 | 2 | 3 | 4 | 1 | 1 | 2 | 3 | 1 | 2 | 3 | 4 | 1 | 1 | 2 | 2 | 1 | 2 | 3 | 4 | 1 | 1 | 2 | 3 |
|---|---|---|---|---|---|---|---|---|---|---|---|---|---|---|---|---|---|---|---|---|---|---|---|
|   |   |   |   |   | 2 | 3 | 4 | 4 |   |   |   |   | 3 | 4 | 3 | 4 |   |   |   |   | 2 | 4 | 3 | 4 |

One active stream: improved latency 16 RBs with 6 RBs received, or improved robustness (9 RBs/6)

Two active streams: same latency and improved robustness (7 RB/8)

Three active streams: reduced robustness (5 RB/6)

Four active streams: reduced robustness (3 RB/6), here, there is protection with more difference depending on the number of active users.

The method according to the invention allows competitive access to resources for cooperative broadcast relaying, which makes it possible to reduce wastage of resources when these are not used, the streams that are present being able to achieve better performances.

By controlling the signatures of the allocations, it is possible to control collisions and to use the robustness of the cooperative transmissions to propagate the streams. A gain in total data rate (and/or latency, and/or number of streams in parallel) is thus achieved. In addition, any collisions that are generated may be prohibitive in some configurations. They are therefore managed using advanced techniques on the PHY/MAC layer, which make it possible either to avoid collisions or to minimize their impact. More gains in terms of latency and multiplexing of streams on the same resources are achieved.

The invention claimed is:

1. A method for transmitting data stream packets within a wireless communication network, said wireless communication network comprising multiple nodes subscribed to one or more streams Fi and sharing one or more resources RBi for transmitting these streams with possibilities of a collision, one or more nodes performing the role of a source transmitting packets of one or more different streams, each stream Fi having a resource allocation signature Si drawn from a set G(Si) of available signatures Si, each resource Ri having an occupancy rate n corresponding to a number of allocated streams, comprising at least the following steps:

at at least one node:
  computing, from the signatures Si of the streams Fi to which the node has subscribed and for each of these streams Fi, reserved resources RBres wherein there is no collision, and resources RBcomp potentially in competition, wherein collisions are possible, checking whether the current resource RB is reserved or whether it is in competition, if the current resource RBres is reserved, if the node is the packet transmission source or if the node has already correctly decoded the packet, transmitting the packet of the stream associated with the resource, if not, attempting to decode the packet of the stream and, if the decoding is correct, storing the decoded packet in memory, if the current resource RBcomp is in competition, applying a method for managing stream collisions on the resources where the occupancy level n is greater than one.

2. The method as claimed in claim 1, wherein the wireless communication network is a multi-hop ad-hoc network that uses a cooperative relaying or cooperative broadcasting technique.

3. The method as claimed in claim 1, wherein time division multiple access time slots on one or more frequency channels are used as resources RBi.

4. The method as claimed in claim 1, wherein time division multiple access time slots on one or more frequency sub-bands, such as OFDMA systems or precoded OFDMA systems, are used as resources.

5. The method as claimed in claim 1, wherein time division multiple access time slots on one or more codes, and/or on one or more layers and/or spatial beams, are used as resources RBi.

6. The method as claimed in claim 1, wherein the set of available signatures is preconfigured in all of the nodes.

7. The method as claimed in claim 1, wherein the set of available signatures is determined dynamically by the nodes.

8. The method as claimed in claim 7, wherein the set of signatures evolves over time or in terms of frequency in accordance with a pseudo-random sequence known to all of the nodes.

9. The method as claimed in claim 7, wherein each transmitter node transmits with a transmission, power control and transmitted signal feature adaptation policy that is given based on the time/frequency synchronization quality, the type of node and its battery level.

10. The method as claimed in claim 1, wherein the assignment of a signature to a stream is predetermined using a pseudo-random sequence computed from common parameters.

11. The method as claimed in claim 1, wherein the collision management method is a collision avoidance method comprising at least the following steps:

checking, in the memory of a node, the packets of streams in competition that have already been decoded correctly the combinations of packets of the streams in competition that have already been decoded correctly by the node, attempting to form the combination of packets that corresponds to the streams in competition on the current resource RBcomp from packets or combinations of packets present in memory and decoded correctly by the node, if the combination is formed, transmitting the combination of packets that corresponds to the streams in competition on the current resource RBcomp, if not, listening in order to decode a combination of packets that corresponds to the streams in competition on the current resource RBcomp, the combination possibly being transmitted by other nodes of the network and, if the decoding is correct, storing this combination of decoded packets in memory.

12. The method as claimed in claim 11, wherein the packets of the streams are combined by applying exclusive or "XOR", bit-by-bit, to the packets decoded by the node.

13. The method as claimed in claim 11, wherein the packets of the streams are combined by applying a network coding technique in the physical layer, which combines the baseband signals corresponding to the packets in question.

14. The method as claimed in claim 1, wherein the collision management method is an interference suppression method comprising at least the following steps:

checking, in the memory of a node, which packets of the streams in competition have already been decoded correctly, applying a decision function between listening or transmitting streams based on the number of packets of the streams in competition that have already been decoded and are present in memory and on the transmission policy, when the node is listening, storing the packets sent on the resource in competition RBcomp by the other nodes and decoded by the node, and applying an interference cancelation-based multi-user reception technique in the physical layer, when the node is transmitting, transmitting the stored stream packet depending on the transmission policy of the stream.

15. The method as claimed in claim 14, wherein the choice, at a node, between listening and transmitting is made based on at least one of the following items of information:

the priority of the data streams, the energy consumption of the node, the battery level of the node, a transmission probability applied in order to reduce the probability of a collision, the nature and the function of the node.

16. The method as claimed in claim 14, wherein the packet separation and detection/decoding method is performed using a series interference suppression method.

17. The method as claimed in claim 14, wherein the choice of the stream to be transmitted for a node is made based on quality of service information associated with the stream, its activity rate coupled with neighborhood/density information.

18. The method as claimed in claim 14, wherein the transmitted packet results from a combination of the decoded packets that are present in memory.

19. A system for transmitting packets in a wireless communication network, said communication network comprising multiple nodes subscribed to one or more streams Fi and sharing one or more resources RBi for transmitting these streams with possibilities of a collision, one or more nodes performing a role of a source transmitting packets of one or more different streams, each stream Fi having a resource allocation signature Si drawn from a set G(Si) of available signatures Si, each resource Ri having an occupancy rate n corresponding to a number of allocated streams, wherein each of the nodes $N_1, \ldots N_6$ comprises a transceiver, in conjunction with a processor configured so as to execute the steps of the method as claimed in claim 1, a database for storing the signatures.

* * * * *